(12) United States Patent
Narayan et al.

(10) Patent No.: US 6,868,156 B1
(45) Date of Patent: Mar. 15, 2005

(54) NON-VOICE SIGNAL REPEATER FOR SPEECH CODERS

(75) Inventors: Shankar S. Narayan, Palo Alto, CA (US); Vijay K. Gupta, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/262,986

(22) Filed: Mar. 5, 1999

(51) Int. Cl.[7] ............................. H04M 3/00; H04M 1/00
(52) U.S. Cl. ..................... 379/386; 379/379; 379/380; 379/381; 379/382; 379/383
(58) Field of Search ................................. 379/379–386, 379/361; 370/525, 526, 535

(56) References Cited

U.S. PATENT DOCUMENTS

| | | | | |
|---|---|---|---|---|
| 4,689,760 A | * | 8/1987 | Lee et al. | 379/386 |
| 5,172,406 A | * | 12/1992 | Locke | 379/386 |
| 5,539,777 A | * | 7/1996 | Grube et al. | 375/316 |
| 5,737,331 A | * | 4/1998 | Hoppal et al. | |
| 6,222,910 B1 | * | 4/2001 | Price et al. | 379/93.17 |
| 6,259,691 B1 | * | 7/2001 | Naudus | |

FOREIGN PATENT DOCUMENTS

| | | | |
|---|---|---|---|
| DE | 4126815 A1 | * | 2/1993 |
| JP | 9-81199 | * | 3/1997 |

OTHER PUBLICATIONS

*General Aspects Of Digital Transmission Systems : Coding Of Speech At 8 kbit/s Using Conjugate–Structure Algebraic–Code–Excited Linear–Prediction(CS–ACELP)*, International Telecommunication Union, ITU–T Recommendation G.729, Mar. 1996.

*Series G : Transmission Systems And Media : Digital Transmission Systems—Terminal Equipments—Coding Of Analogue Signals By Methods Other Than PCM*, International Telecommunication Union, ITU–T Recommendation G.729—Annex A, Nov. 1996.

*General Aspects Of Digital Transmission Systems : Dual Rate Speech Coder For Multimedia Communications Transmitting At 5.3 And 6.3 kbit/s*, International Telecommunication Union, ITU–T Recommendation G.723.1, Mar. 1996.

Chapter 6, Signalling Requirements, EIA/TIA–464B, pp. 140–146.

\* cited by examiner

*Primary Examiner*—Forester W. Isen
*Assistant Examiner*—Ramanadna Singh
(74) *Attorney, Agent, or Firm*—Blakely, Sokoloff, Taylor & Zafman LLP (57) ABSTRACT

A method of repeating a non-voice signal such as a dual tone, multiple frequency (DTMF) signal, by inserting a delay sequence of data values into an output data sequence of data values, a portion of the output data sequence following the delay sequence being the same as a corresponding portion of an input sequence of decoded data obtained from a low bit-rate speech decoder. The input sequence has at least one distorted non-voice sequence. The method provides for inserting a substantially undistorted non-voice sequence into the output sequence, the undistorted sequence being at least of substantially the same length as the distorted sequence, a portion of the output sequence following the undistorted sequence being the same as a corresponding portion of the input sequence, and the output sequence being substantially free of the distorted non-voice signal.

25 Claims, 10 Drawing Sheets

NON-VOICE SIGNAL REPEATER FOR SPEECH CODERS

FIELD OF THE INVENTION

This invention is generally related to digital processing of voice and tone signals, and more particularly to detecting tone signals in decoded data from a speech coding process.

BACKGROUND

Global communication systems having digital transmission pipes are being subjected to massive amounts of digital information including both voice and data signals. To make more efficient use of these pipes, the original information can be compressed at the sender before being launched into the pipe. The compressed information is then decompressed at the receiver into its original form before it can be used. For instance, speech coders are optimized to compress voice signals by taking advantage of certain characteristics of human speech patterns.

Recently, several popular low bit-rate speech coders/decoders have been developed which can compress a 64 kbit/sec digitized voice signal into 16 kbit/sec or lower, and still provide a relatively clear sounding, decompressed voice signal. However, such low bit-rate speech codecs, and particularly those which compress to 8 kbit/sec or lower, exhibit poor performance with non-voice signals. These non-voice signals include single or multi-tone signals that are generated by pressing the digits on a telephone keypad, such as for accessing voicemail and bank account records. The low bit-rate speech codec distorts these tone signals, such that the use of conventional techniques for detecting tone signals in the reconstructed sequence of decoded data have been unreliable in detecting the proper digit that was pressed.

SUMMARY

An embodiment of the invention is directed to a method of repeating a non-voice signal by inserting a delay sequence of data values into an output data sequence of data values, a portion of the output data sequence following the delay sequence being the same as a corresponding portion of an input sequence of decoded data obtained from a speech decoder. The input sequence has at least one distorted non-voice sequence. The method provides for inserting a substantially undistorted non-voice sequence into the output sequence, the undistorted sequence being at least of substantially the same length as the distorted sequence, a portion of the output sequence following the undistorted sequence being the same as a corresponding portion of the input sequence, and the output sequence being substantially free of the distorted non-voice signal.

Other features and advantages of the invention will be apparent from the accompanying drawings and from the detailed description that follows below.

BRIEF DESCRIPTION OF THE DRAWINGS

The invention is illustrated by way of example and not limitation in the figures of the accompanying drawings in which like references indicate similar elements and in which.

DETAILED DESCRIPTION

Various embodiments of the invention are directed to a method and apparatus that ensures reliable transmission of non-voice signals through a speech coding/decoding process. A distorted non-voice signal in a time sequence of input decoded data received from a speech decoder is regenerated to match the version of the non-voice signal prior to being encoded. This is done without impacting voice signals which may also be present in the input decoded data. In certain embodiments, a predictor repeatedly examines each frame of the input decoded data to predict the onset of a tone signal prior to launching a computationally more demanding and reliable tone detection scheme. When the tone signal has been confirmed, a clean, undistorted tone signal of approximately the same duration as the distorted signal is generated to replace the distorted signal in an output sequence of decoded data.

In a particular embodiment, a technique is described for detecting non-voice signals such as dual tone multiple frequency (DTMF) signals in the decoded data, and replacing the signals with undistorted DTMF signals. These undistorted DTMF signals may correspond to DTMF digits (e.g., 0 to 9,*, # on a keypad) and may be of the same duration as the detected DTMF signals. In yet another embodiment, the above technique of detecting and replacing the DTMF signals is accomplished by inserting the minimum amount of delay into the output sequence when it has been determined that the decoded data probably contains no DTMF signals, and inserting a larger delay (needed for DTMF detection) only if the presence of DTMF signals has been predicted. It should be noted that the techniques described here in the context of DTMF signals may also be used with codec systems featuring other types of non-voice signals like multi-frequency (MF) tones.

Figure 1:
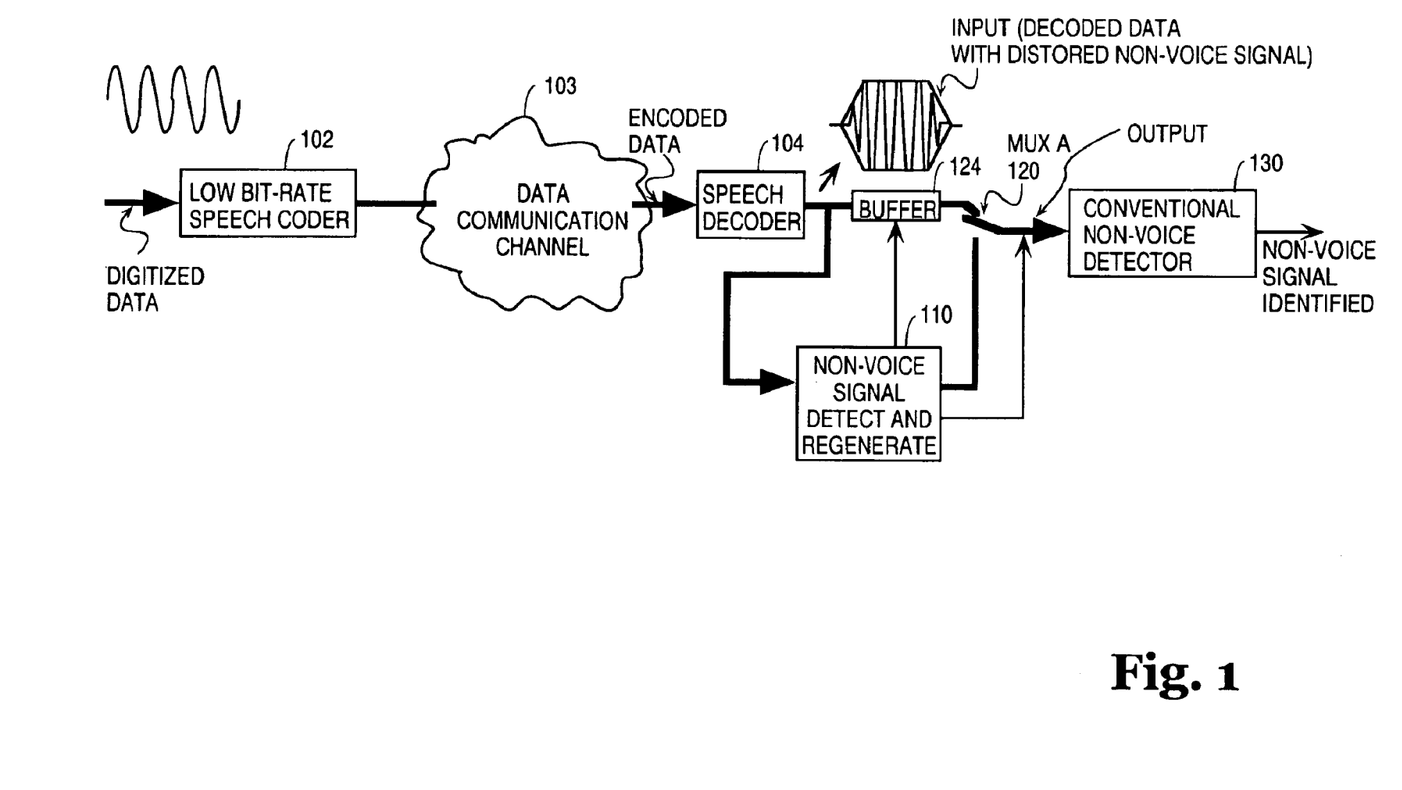
FIG. 1 illustrates a logical block diagram of a technique for processing non-voice signals according to an embodiment of the invention.

FIG. 1 illustrates a logical block diagram of a technique for processing non-voice signals according to an embodiment of the invention. Digitized data (including both voice and non-voice signals) are received by a conventional speech coder 102. Examples of such coders include low bit-rate types which comply with (1) G.729 (ITU-T Recommendation G.729, *Coding of Speech at 8 kbit/s using conjugate-structure algebraic-code-excited linear prediction (CSA-CELP)*, Mar. 19, 1996), (2) G.729A (ITU-T Recommendation G.729 Annex A, *Reduced complexity 8 kbit/s CSA-CELP Speech Codec*, Nov. 8, 1996), and (3) G723.1 (ITU-T Recommendation G.723.1, *Dual Rate Speech Coder for Multimedia Communications Transmitting at 5.3 and 6.3 kbit/s*, Mar. 19, 1996), standards developed by the International Telecommunication Union (ITU). The encoded data then passes through a data communication channel 103. The channel may include a computer network or other digital communication pipe. The encoded data finally emerges from the channel and is fed to a speech decoder 104 (which corresponds to the coder 102). The decoder reconstructs the original digitized data as a sequence of input decoded data, including a distorted non-voice signal, which is forwarded to a buffer 124 having a first in first out structure. A signal processor 110 taps into the sequence of input data, and generates a select signal when it identifies the non-voice signal in the input sequence. A multiplexer A (120) is used to select between the input data from the buffer and regenerated non-voice data in response to the select signal. The buffer is large enough to allow the processor sufficient time to confirm the identification of the non-voice signal. For instance, if the non-voice signal comprises dual tone multiple frequency (DTMF) signals, then approximately 50 msec may be required to confirm the DTMF tone and thus its corresponding digit. The output sequence will thus contain the decoded data and a substantially undistorted non-voice sequence such as a regenerated non-voice sequence that matches the distorted sequence in frequency content. The output sequence may then be fed to a conventional detector 130 such as a DTMF detector to reliably identify the undistorted non-voice signal.

Because a reconstructed DTMF signal emerging from a low bit-rate speech decoder is distorted, the algorithm used to detect digitized DTMF signals that have undergone a low bit-rate speech coding/decoding process will need to be reconfigured to be less stringent than conventional DTMF detectors conforming to the standards set forth by the ITU, and by the Electronics Industry Association/Telephone Industry Association in EIA/TIA-464B, pp. 140–146. For instance, the range of amplitudes and the relative phase variation in the decoded data, as well as the time interval during which such attributes are evaluated to identify a tone signal should be modified to accommodate the additional distortion caused by the low bit-rate speech coding scheme. These ranges may be set by one of ordinary skill in the art using trial and error, according to the particular speech coding scheme being used.

Figure 2:
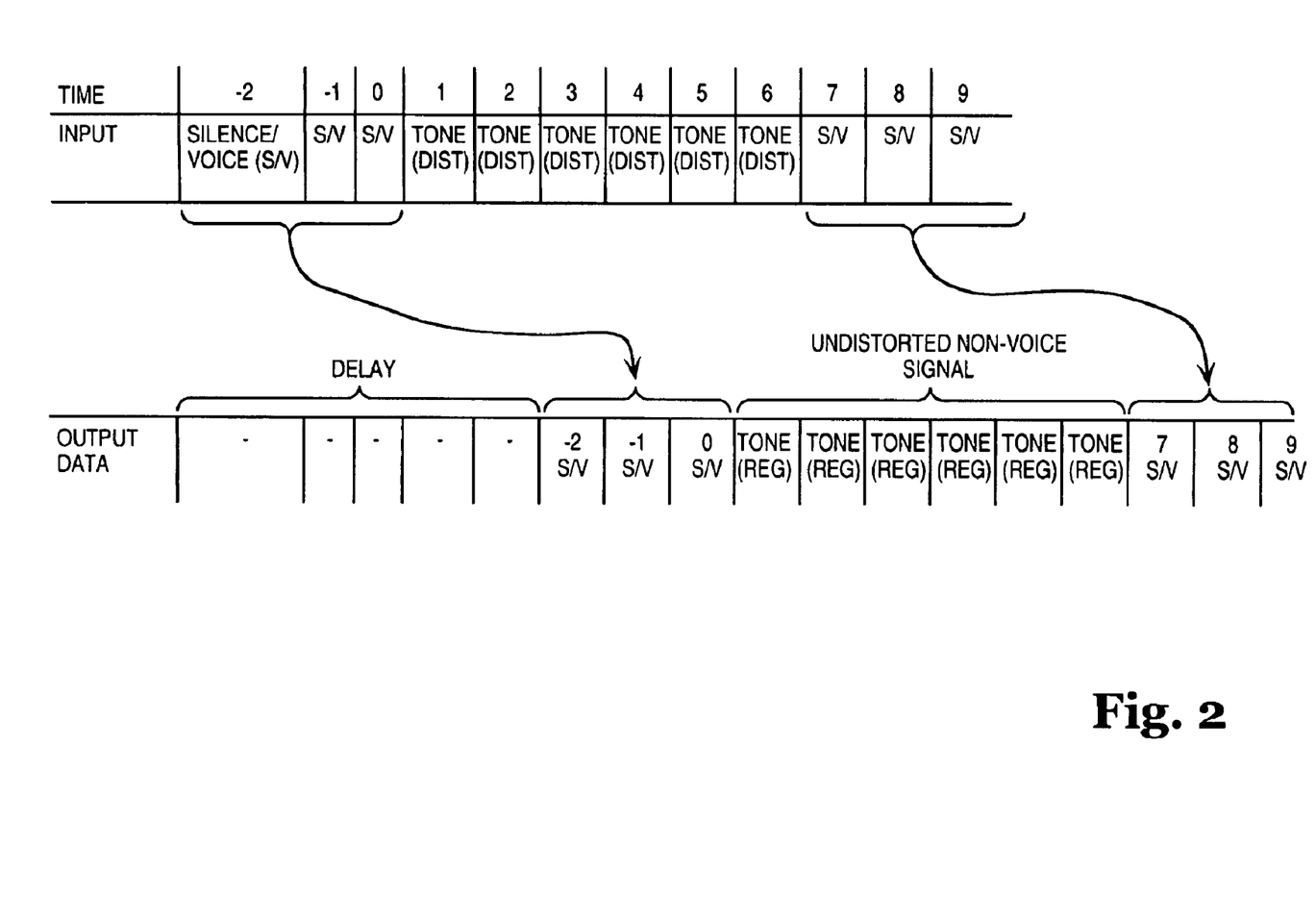
FIG. 2 shows repeater input and output data, along a timeline, for an embodiment of the invention.

FIG. 2 shows input data including silence, voice, and distorted non-voice signals, and output data, along a timeline, for an embodiment of the invention. Initially, the output data is uncertain while the buffer fills with the input decoded data. In this example, the buffer is 5×10 msec long, each frame of data being 10 msec long, such that a sequence of decoded data 50 msec long can be stored and then delivered, in a FIFO manner, to the output. The 5×10 msec is only an example that may be particularly useful for DTMF signals. In general, a wide range of buffer and frame lengths may be used depending on the particular non-voice signal to be detected, the bit-rate of the speech coding scheme, and the processing power available.

Figure 3:
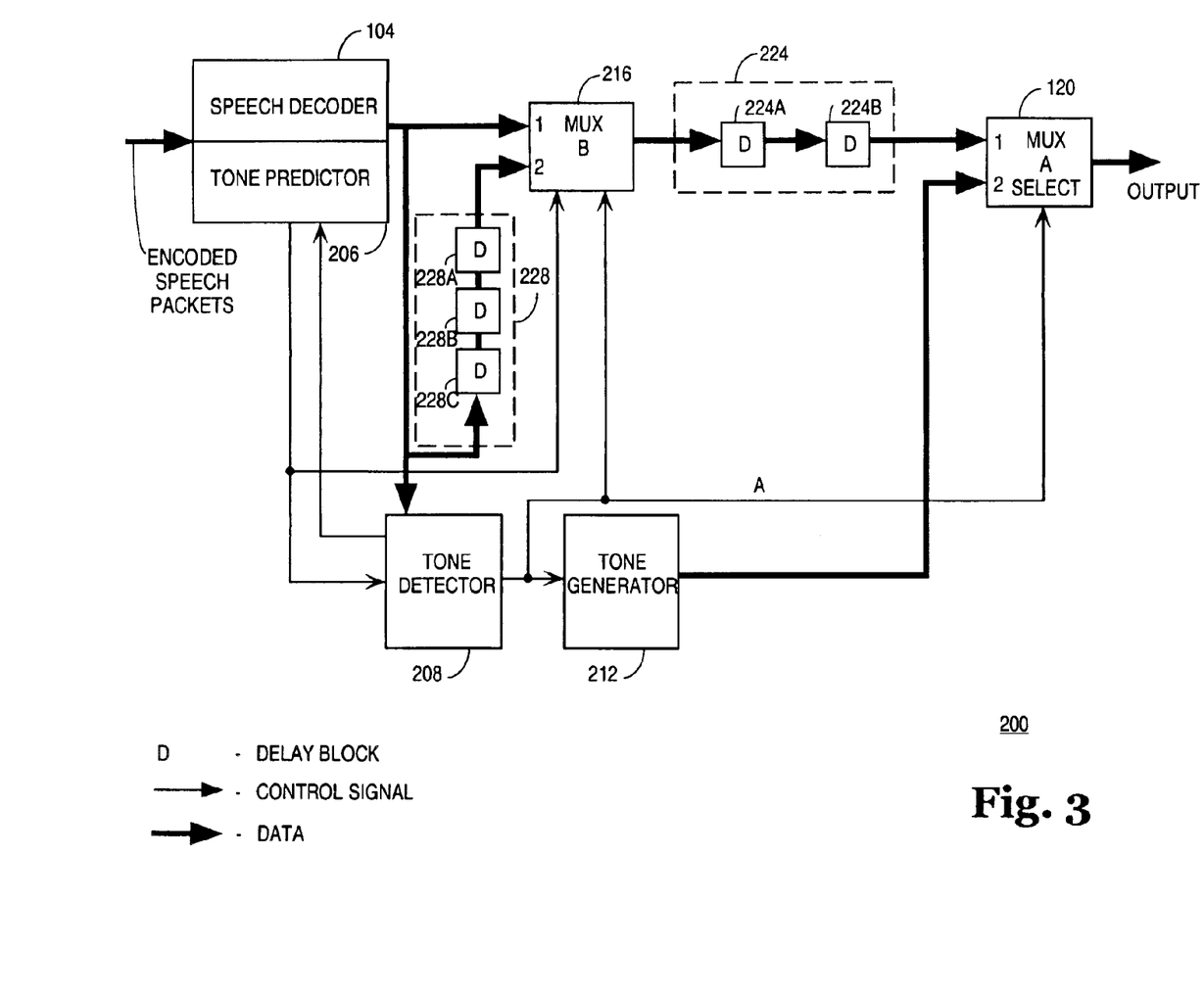
FIG. 3 depicts a block diagram of a repeater which may be implemented as hardwired logic according to an embodiment of the invention.

The embodiment of the invention described above introduces a delay in the output sequence of decoded data which may be too long for certain applications. Moreover, when implemented as purely software, the signal processor 110 in FIG. 1 may consume a substantial amount of processing power because it is continuously evaluating the decoded data. Accordingly, FIG. 3 illustrates another embodiment of the invention as a repeater 200 which identifies and regenerates the distorted non-voice signal in a more efficient manner, reducing the delay in the output sequence when no non-voice signal is likely. This embodiment also helps make more efficient use of processing power, when implemented either as purely software or as primarily hardwired logic.

In FIG. 3, the speech decoder 104 receives encoded speech packets (including voice and non-voice information) and in response provides a sequence of decoded data. The decoded data follows two paths, one to mux B and perhaps to first buffer portion 224 and another to a tone detector 208 and a second buffer portion 228. Each buffer portion is composed of a number of delay blocks a, b, c, ... where each delay block is a FIFO buffer, preferably of the same size, that can store a frame of the decoded data. Although not shown, the buffers should be configured to be bypassable at any time, so that any additional delay, which is no longer needed due to the absence of a non-voice signal in the decoded data, can be eliminated immediately to avoid discontinuities in the output sequence. This effect will be explained below.

The detector 208 generates a select signal in response to confirming the non-voice signal in the sequence of decoded data to select mux A's second input, and also instructs a tone generator 212 to begin a sequence of regenerated data that matches the distorted non-voice signal. The tone detector 208 and the tone generator 212 may be similar to the processor 110 of FIG. 1 described above.

The mux A (120) has an output that provides data from its first input or second input in response to the A select signal received from the detector 208. The first input receives the first buffer output and the output of multiplexer B (216). The mux B in response to select signals from either the decoder 104 or the detector 208 supplies decoded data from either the decoder 104 or the second buffer portion 228. The second input of mux A receives regenerated non-voice data from the tone generator 212. A predictor 206 determines whether a non-voice signal, such as a tone or DTMF signal, is likely to be present in a given frame of decoded data. This may be done based on a rapid analysis of certain values that characterize the speech coding/decoding scheme being used. These are associated with the decoded data and may be either received by the decoder 104 from the communication channel or computed by the decoder or predictor. The prediction will normally occur much faster than the confirmation and identification by the tone detector 208. When the non-voice signal is found to be likely, the signal selecting the second input of mux B is generated, thus introducing an additional delay into the data path. Various embodiments of the predictor 206 will be described below in connection with FIG. 10.

Figure 4:
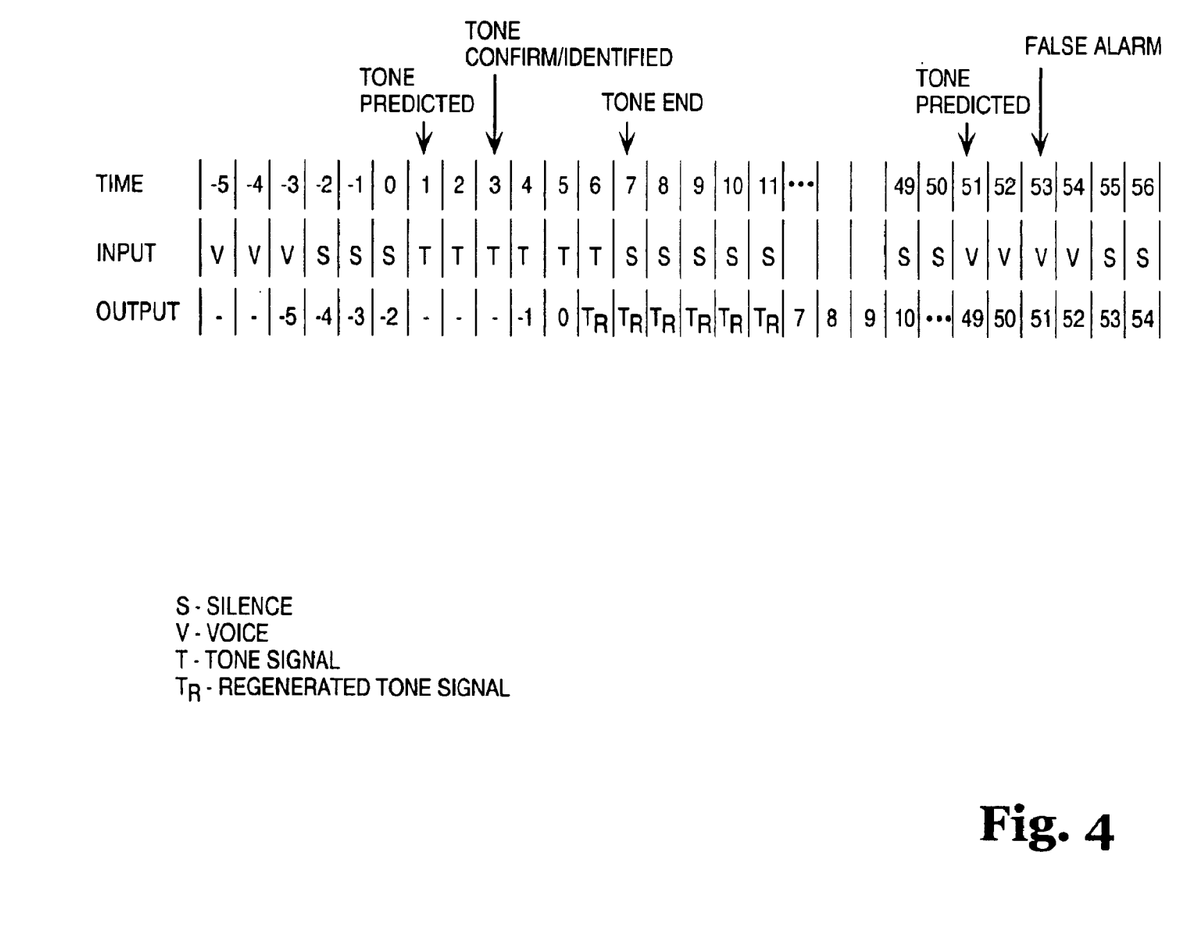
FIG. 4 shows a timeline of repeater input and output data featuring tone prediction according to an embodiment of the invention.

Operation of the repeater 200 in FIG. 3 may be described as follows in conjunction with the timeline of FIG. 4. As an initial matter, the buffer portions 224 and 228 may be filled with data representing silence, and the first inputs of the respective muxes are selected. As such, a first delay (via first buffer portion 224) is in the path of the decoded data which emerges from the decoder 104. Thus, the decoded data is forwarded to the output, delayed by the first buffer portion 224.

When the predictor 206 determines that a non-voice signal is likely in the next frame of decoded data to be forwarded to the first buffer portion 224, the detector 208 is instructed to begin analyzing the decoded data being provided by the decoder 104 to confirm and identify the non-voice signal. In addition, the predictor selects the second input of mux B, thus inserting a larger delay, first and second buffer portions combined, in the path of the decoded data. The frames contained in blocks 228a, 228b, and 228c of the second buffer portion 228 are initially set to silence before receiving the next frame.

The detector 208 should be able to confirm the presence of a non-voice signal after analyzing the next three consecutive frames. Thus, three frames of silence (contained in 228a, b, and c) are inserted into the output sequence. The tone generator 212 is then instructed to generate a sequence of clean/regenerated data representing the non-voice signal which was confirmed and identified by the detector 208. By this time, delay blocks 228a, b, and c contain frames having the distorted non-voice signal ("non-voice frames"), while blocks 224a and 224b contain the two frames which preceded the non-voice frames. Once the latter two frames have been forwarded to the output, the second input of mux A is selected to forward the regenerated data rather than the distorted non-voice frames.

In certain embodiments, the regenerated data continues to be delivered through mux A for a predetermined time as defined by the tone signaling standard (e.g., ITU or EIA/TIA), until the detector 208 detects the end of the non-voice signal in the decoded data, or whichever interval is greater. When the tone detector 208 detects the end of the non-voice signal in the frame contained in delay block 228c, it waits until the last non-voice frame has been regenerated and delivered to the output before generating and delivering an interval of silence to the output. As an example, the end of the non-voice signal may be defined by a certain interval of silence following the non-voice signal in the decoded data. However, many other events may also be used to indicate the end of the non-voice signal.

To reduce the delay and discontinuity in the output sequence, the tone detector 208 and the buffers are configured to eliminate any extra delay (introduced earlier when the non-voice signal was predicted) if no non-voice signals have been detected after a given interval has elapsed. This may be done by flushing the appropriate delay blocks and selecting the first input of the muxes (shorter delay in the path). This feature allows the output sequence to be free of discontinuities when a false alarm is determined, as shown in time intervals 49–56 in FIG. 4. For example, in the embodiment that uses DTMF signals and where each frame is 10 msec long, the detector 208 should be able to determine a false alarm within at most two frames. Thus, in time interval 53, the excessive delay is eliminated (delay blocks 224a, 224b, and 228a are flushed) and the output sequence resumes with frame 52 in delay block 228b.

An alternative embodiment of the invention will be described in connection with FIGS. 5–10 which are flow diagrams that may be used to implement the repeater 200 as purely software. The repeater software examines the decoded data, provides the needed buffering in the path of the output sequence, and takes appropriate action as described below. The repeater software involves the following variables and states:

The variable tone_flag when asserted signifies that a non-voice signal is likely to be encountered in a given frame. Various techniques to determine when the Tone_Flag should be set will be described below in connection with FIG. 10.

The variable tone_count will be used to maintain the repeater in a tone detection mode for situations in which multiple non-voice signals, corresponding to, for instance, multiple DTMF digits, are likely to be detected in the sequence of decoded data.

Voice_Stream, Tone_Idle, Tone_First_Break_Detect, and Tone_Break_Detect are various states of the repeater (Repeater State). In Voice_Stream, the repeater is repeating voice signals. The repeater is in the Tone_Idle state when the tone_flag is set and the repeater is analyzing the decoded data for non-voice signals. When the tone_flag is set and the repeater has just confirmed and identified the non-voice signal as representing, for instance, a known DTMF digit, the repeater enters the Tone_First_Break_Detect state. When the tone_flag is set and the repeater has confirmed and identified the non-voice signal and is scanning the interval of silence which normally follows a DTMF signal, the repeater is in the Tone_Break_Detect state.

Idle, Confirm_Digit, and Break_Detect are various states of the Tone_Detector, software that roughly corresponds to the tone detector 208 and tone generator 212 in FIG. 3. When the Tone_Detector starts detecting the presence of a non-voice signal such as a DTMF signal, but has not yet confirmed or identified the signal, it is in the Confirm_Digit state. After a non-voice signal is identified and confirmed for a minimum interval, the Tone_Detector causes the detected signal to be regenerated, and itself enters the Break_Detect state. Here, the Tone_Detector continues to cause regeneration of the non-voice signal until an interval of silence is detected. After the silence is also regenerated, the Tone_Detector returns to Idle, and continues processing the decoded data to detect the next non-voice signal.

Initially as well as when not passing any non-voice signals, the repeater is in the Voice_Stream state. When tone_flag is set indicating that a non-voice signal is likely to be encountered in the next frame of decoded data, the repeater introduces an additional second delay to the path of the decoded data and enters its Tone_Idle state. In the Tone_Idle state, the repeater waits for a non-voice signal to be confirmed and identified by the Tone_Detector. After the non-voice signal has been identified, the repeater enters Tone_Break_Detect state after transitioning through Tone_First_Break_Detect for one frame, and waits for an interval of silence to be detected following the non-voice signal. After the interval of silence has been detected, the repeater is returned to its Tone_Idle state.

Note that multiple non-voice signals may be detected by the tone detector so long as tone_flag is set. The tone_flag is cleared if no non-voice signal is confirmed in the decoded data for a given time interval. The tone_flag is cleared when a non-voice signal is not confirmed in a number of frames after the detector has entered the Idle state. When the tone_flag is cleared, the repeater is placed back into its Voice_Stream state after the second delay has been eliminated from the data path.

Once a valid non-voice signal has been confirmed for a minimum predetermined interval (e.g., 30 msec) and has been identified, the Tone_Detector causes regenerated data matching the identified non-voice signal to be delivered to the output for the appropriate amount of time. Thereafter, the Tone_Detector enters the Break_Detect state during which it scans the decoded data in the current frame for a predefined interval of silence. Once the period of silence has been detected, the Tone_Detector returns back to the Idle state and waits until being called to confirm the next non-voice signal in the sequence of decoded data.

Figure 5:
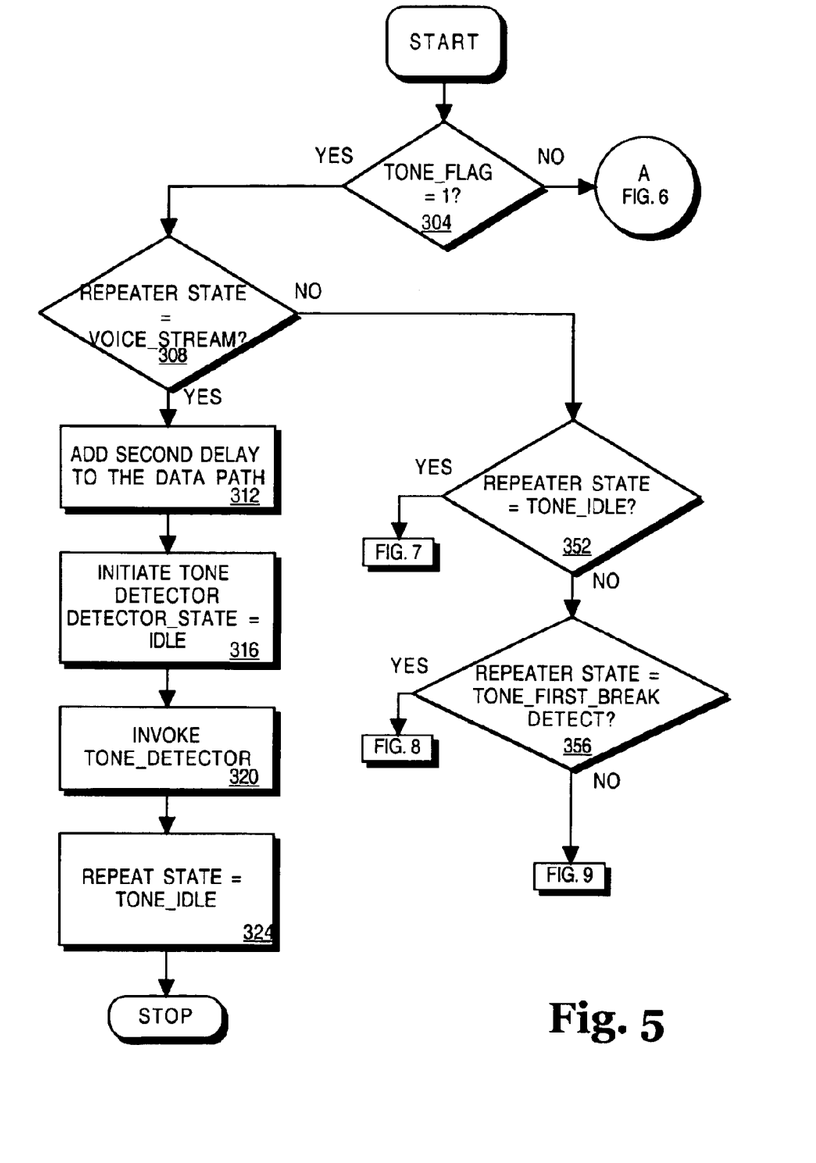
FIGS. 5–9 are flow diagrams of the repeater according to a software embodiment of the invention.
Figure 10:
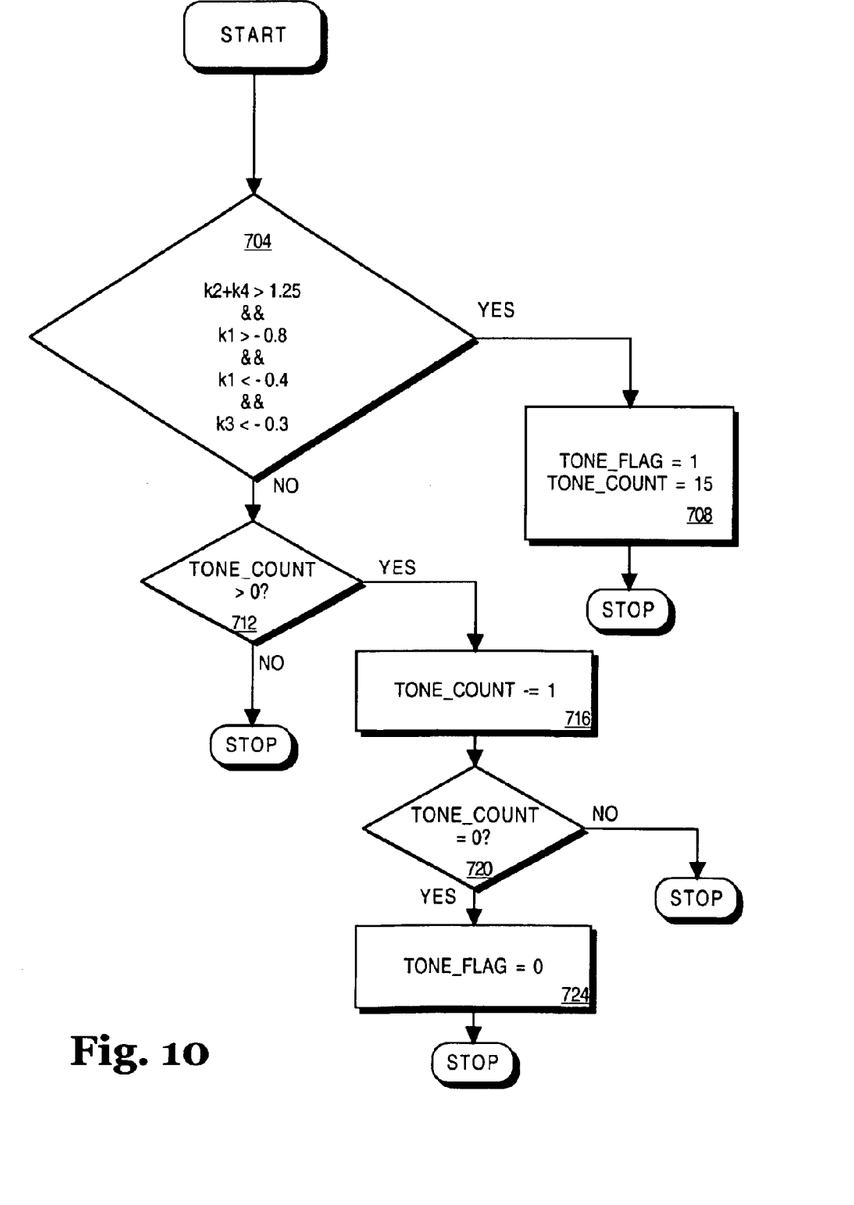
FIG. 10 is a flow diagram of a tone predictor according to an embodiment of the invention.

With the above framework in place, a more detailed operation of the repeater 200 according to an embodiment of the invention may be described using the flow diagrams of FIGS. 5 and 10. Initially the repeater state is set to Voice_Stream, and a first delay is implemented in the path of the decoded data. In FIG. 5, operation begins with decision block 304 in which tone_flag is checked. If this flag is set, and if the repeater state is Voice_Stream, as in decision block 308, then there is a likelihood that a non-voice signal is present (prediction) in the decoded data. Thus, operation proceeds in step 312 with adding a second delay to the data path. In a particular embodiment, this first delay may be two blocks of 10 msec each. Operation proceeds in step 316 in which the Tone_Detector is initialized to Idle. The Tone_Detector is then called in step 320 to process the decoded data, and the RepeaterState is changed to Tone_Idle in step 324.

On the other hand, returning to decision block 308, if RepeaterState is not Voice_Stream, then operation proceeds with decision steps 352 and/or 356. If the repeater is in Tone_Idle, then step 352 leads to FIG. 7. When in the Tone_Idle state 402, the Tone_Detector is called in step 404 to analyze the sequence of decoded data. If a non-voice signal is identified in step 408, then the repeater enters Tone_First_Break_Detect state in step 424, and then initiates regeneration of the identified signal in step 428. If a given interval has lapsed as in decision block 412 without a non-voice signal being identified, then the prediction (setting of the tone_flag) was a false alarm. The excess delay in the data path is eliminated in step 416, the tone_flag is cleared in step 420, and the repeater starts to deliver the frames which occurred prior to the prediction.

Figure 8:
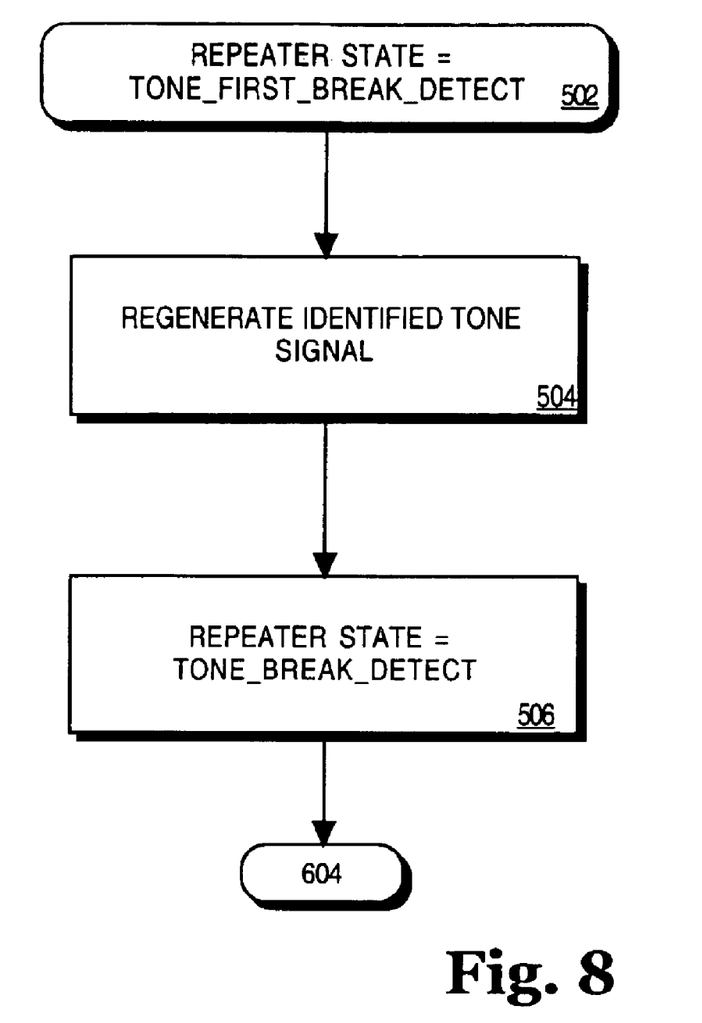
Figure 9:
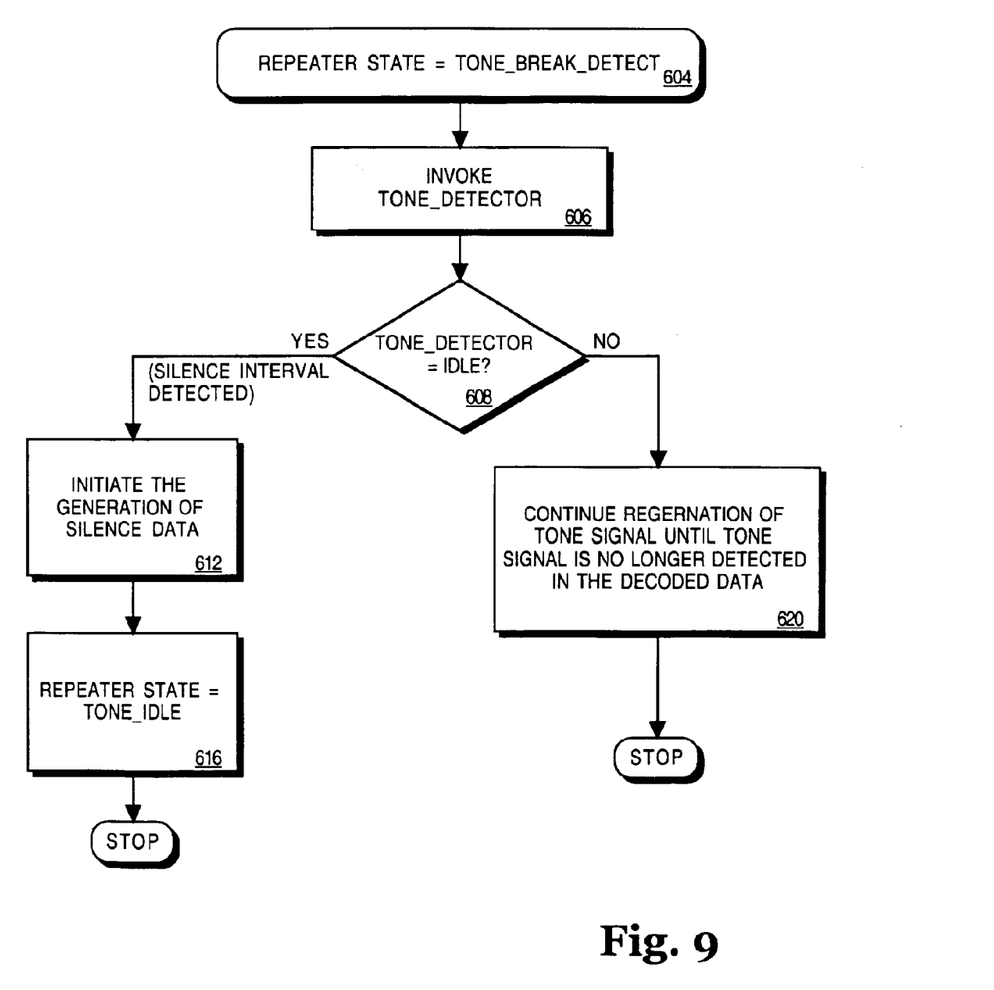

Returning to FIG. 5 and decision block 308, if the repeater is in Tone_First_Break_Detect as in FIG. 8, then the repeater initiates the regeneration of the identified non-voice signal in step 504, and in step 506, the repeater changes to Tone_Break_Detect. This leads to FIG. 9 where in the Tone_Break_Detect state 604, the decision block 608 decides if the Tone_Detector is Idle. If not, step 620 provides the continued regeneration of the non-voice signal until the signal is no longer detected in the decoded data. If, however, the Tone_Detector is in the Idle state, then the interval of silence is started in step 612 and the repeater returns to Tone_Idle in step 616.

Returning to FIG. 5, to the right side of decision block 304 are operations that are performed while the repeater is waiting for a non-voice signal to be predicted. Thus, in decision block 340 of FIG. 6, if the repeater state is Voice_Stream, then a first delay is implemented in the data path as in step 344. Thus, it can be seen that if there is no non-voice signal being predicted, the output sequence of decoded data follows the input sequence by only a first delay. In certain embodiments, the first delay may be made as short as possible so long as the voice and non-voice signals are properly distinguished, thus helping further minimize the voice signal delay in the output sequence of decoded data.

Figure 6:
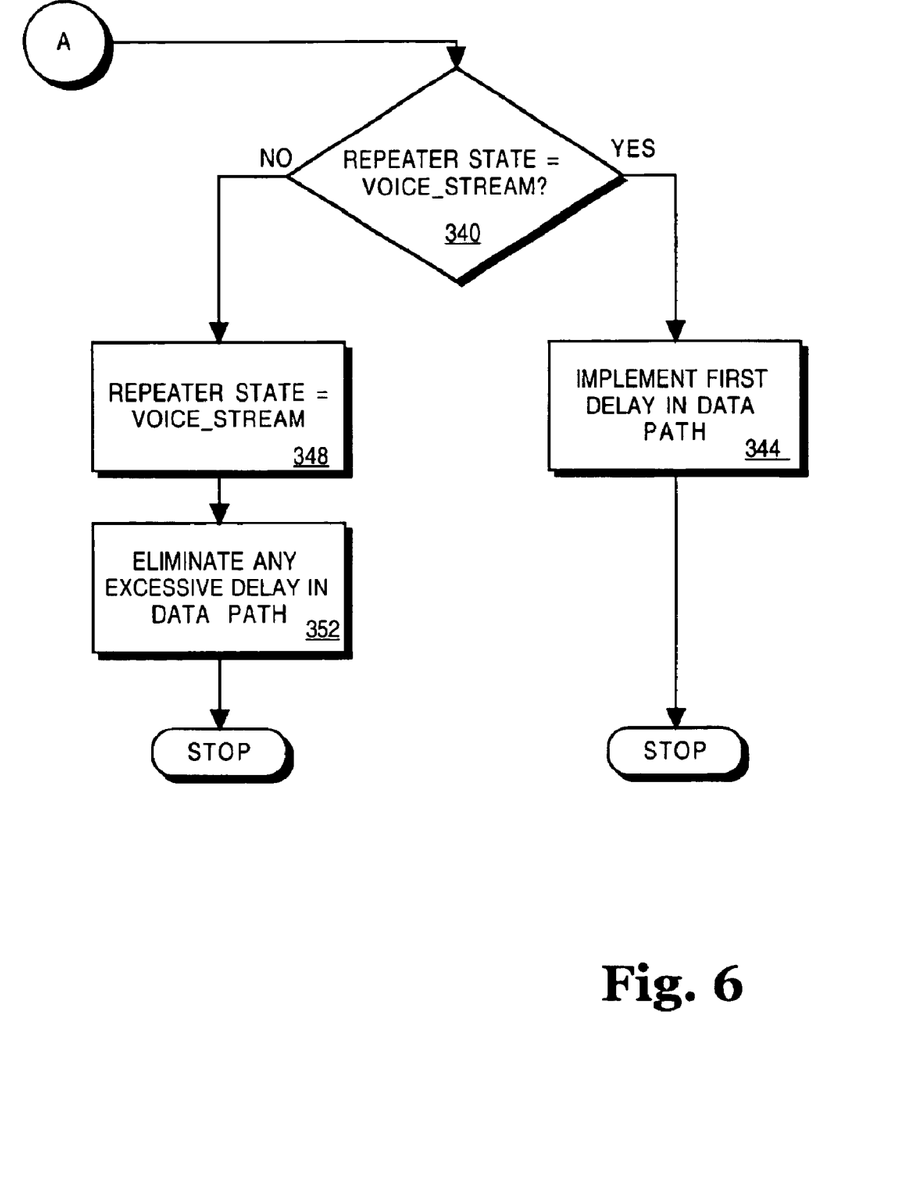
Figure 7:
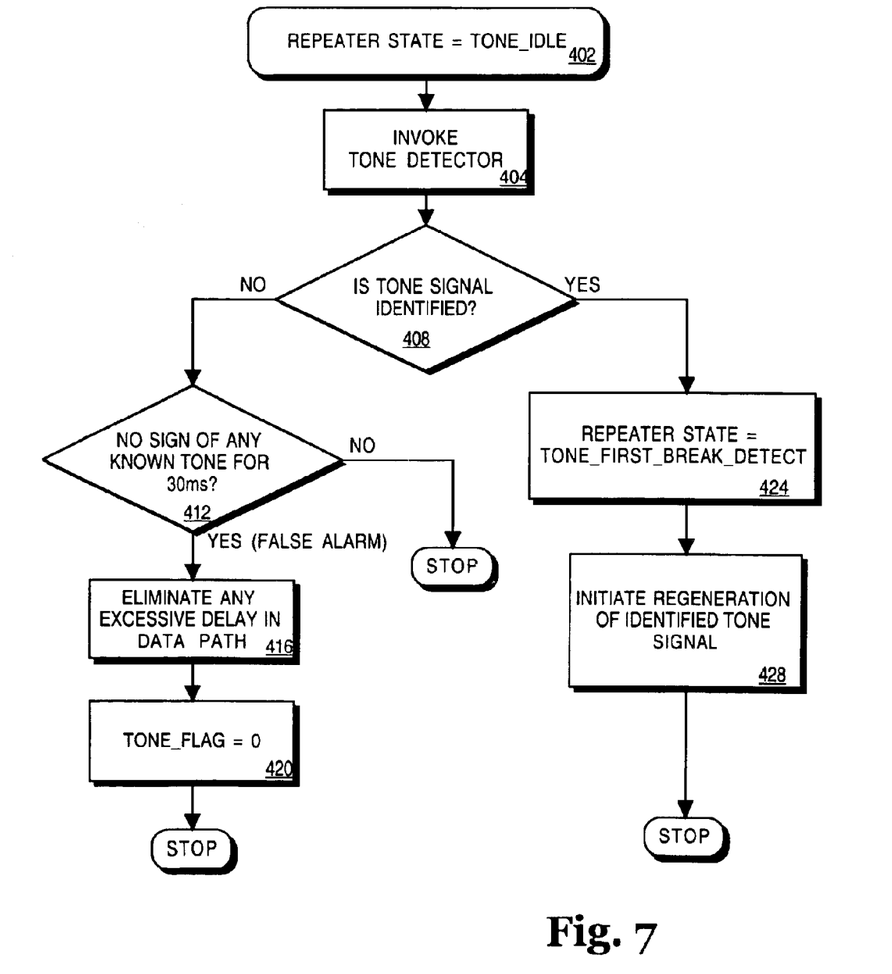

If tone_flag is not set, and the RepeaterState is other than Voice_Stream, this indicates that a non-voice signal may have been previously confirmed and identified (detected), but a time out period has expired without any non-voice signals being detected. Thus, the repeater is returned to Voice_Stream in step 348 and the second delay in the data path is eliminated in step 352. The above sequence of operations in FIG. 5 and FIG. 6 are repeatedly performed by the repeater software while decoded data is being received.

FIG. 10 illustrates a flow diagram of an embodiment of the tone predictor according to an embodiment of the invention. This flow diagram may be executed in every frame of decoded data. Initially, tone_flag and tone_count are set to zero/cleared. Operation begins with decision block 704 in which certain values characteristic of the speech coding scheme used are evaluated based on the current frame of decoded data to determine the likelihood of a non-voice signal being present in the current frame. In the particular embodiment shown, $k_1$, $k_2$, $k_3$, and $k_4$ are conventional linear prediction (LPC) parameters (also known as reflection coefficients) that are received by the decoder and associated with the sequence of decoded data. In general, any coding parameters used to represent the spectral information in the decoded data can be used to predict the onset of a non-voice signal. Various known speech coding techniques may be used such as these described in *Digital Processing of Speech Signals*, L. R. Rabiner and R. W. Schafer, Prentice Hall, Inc., Englewood Cliffs, N.J.

The particular inequalities in decision block 704 are suitable to predict DTMF signals. It should be noted that these inequalities are not the only ones which can provide adequate prediction. Many others can be developed by those of ordinary skill in the art to predict the presence of tones. In general, if the characteristic values in decision block 704 indicate that one or more dominant tones, for instance two dominant tones being substantially equal in amplitude and of frequency below 2000 Hz, are likely to be present in the current frame, then operation proceeds with step 708 in which tone_flag is set to 1 and tone_count is set to a predetermined number that may represent the number of frames of decoded data which are scanned for non-voice signals. For this example, tone_count is set to 15, however, smaller or greater numbers may also work. On the other hand, if decision block 704 is not true, then tone_count is decremented in step 716 and checked in step 720. If Tone_Count in step 720 has reached zero, then tone_flag is set to zero in step 724, signifying that the maximum number of attempts to identify non-voice signals have been reached.

The above description of the flow diagrams in FIGS. 5–10 may be summarized by a processing sequence that occurs for each frame of decoded data, as shown below. Each paragraph numbered a, b, . . . below describes a series of operations that are performed by the software repeater provided that the conditions underlined for each paragraph are true.

a. Tone Count=0; RepeaterState=Voice_Stream and LPC Parameters Do Not Indicate DTMF Signal:
Insert 20 ms of delay in the output steam. No processing is performed in the repeater.
RepeaterState remains unchanged.

b. (Tone_Count>0) and (RepeaterState=Voice_Stream)
First indication that DTMF signal may be starting. Introduce an additional 30 msec of delay in the data path.
Initialize Tone_Detector and set DetectorState=Idle.
Invoke Tone_Detector.
The repeater will enter RepeaterState=Tone_Idle state.

c. RepeaterState=Tone_Idle and DetectorState=Break_Detect (Digit detected).
Tone_Detector alters the DetectorState.
In order to reduce peak processing load, do nothing now, but go to new state.
RepeaterState=Tone_First_Break_Detect.

d. RepeaterState=Tone_First_Break_Detect
Once the DTMF digit is detected in the decoded data stream, up to 50 ms of undistorted data corresponding to the detected DTMF digit is generated and delivered to the output.
RepeaterState=Tone_Break_Detect.

e. RepeaterState=Tone_Break_Detect and DetectorState=Break_Detect
Continue generating DTMF signal up to 50 msec or a DTMF signal continues to be detected, whichever is greater.

f. RepeaterState=Tone_Break_Detect and DetectorState=Idle
A minimum of 30 msec silence has been detected. Generate silence data for a minimum of 50 ms. Examine the data in the delay blocks and start zeroing the data from as far back as possible.
Set RepeaterState=Tone_Idle.

g. RepeaterState=Tone_Idle and DetectorState=Idle
This indicates that a DTMF digit has been detected and regenerated (i.e., processing of a digit is completed). The decoded data stream may contain more DTMF digits, or this could be the last digit with voice data to follow. The repeater, in this state, will wait to analyze the decoded data to determine its next action. Generally, this state indicates silence between digits, or the end of DTMF signaling.

h. Tone_Count=0 and RepeaterState Not Equal to Voice_Stream tone_flag is turned off.
Eliminate excess delay (here, 30 msec).
Set RepeaterState=Voice_Stream.

An additional feature of an embodiment of the invention concerns speech coders/decoders which perform a function called post-filtering to enhance the subjective quality of speech in the decoded data. Post-filtering is a computationally expensive processing step which is not needed for reliable transmission of non-voice signals such as DTMF signals. In fact, post-filtering tends to further distort the non-voice signal thus making the signal more difficult to identify in a reliable manner. Accordingly, in a particular embodiment of the invention, the repeater may be configured such that post-filtering is turned off when the non-voice signal has been predicted. This step further reduces the processing power required by the repeater, and in addition reduces the distortion of the non-voice signals, making them easier to identify.

To summarize, various embodiments of the invention as a signal repeater for use with speech coders have been described. In certain embodiments, the repeater provides a relatively shorter delay in the output sequence as compared to conventional DTMF detectors. Only after the presence of a non-voice signal has been predicted is the delay increased for more accurate detection of the signal. Furthermore, when a predetermined number of frames of decoded data have shown a low likelihood of a non-voice signal being present, then any excessive delay is removed, thus returning the repeater to its more optimal form in which the output sequence is subjected to only a much shorter delay. For these embodiments, an input sequence of decoded data is thus repeated, except that distorted non-voice signals are essentially replaced by regenerated and matching non-voice signals, with minimal voice signal delay in the output sequence. Conventional non-voice signal detection schemes may thereafter be used, based on the repeated output, to more reliably detect the regenerated DTMF signals.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather that a restrictive sense.

What is claimed is:

1. A method comprising:
    subjecting an input sequence of decoded data obtained from a speech decoder to a first delay, the input sequence having at least one distorted non-voice sequence representing a non-voice signal; and then
    subjecting the input sequence of decoded data to a second delay that is longer than the first delay, in response to determining that a non-voice signal is likely to be encountered in a next frame of said decoded data; and then
    inserting a substantially undistorted non-voice sequence into an output sequence in response to having identified the non-voice signal in said distorted sequence, the undistorted sequence being at least of substantially the same length as the distorted sequence, a portion of the output sequence following the undistorted sequence being the same as a corresponding portion of the input sequence, the output sequence being substantially free of the distorted non-voice sequence.

2. The method of claim 1 wherein the undistorted non-voice sequence comprises a sequence of dual tone multiple frequency (DTMF) signal values.

3. The method of claim 1 wherein the substantially undistorted non-voice sequence comprises a regenerated non-voice sequence that matches the non-voice signal.

4. The method of claim 1 further comprising processing the output sequence to identify the undistorted sequence as representing a DTMF digit.

5. A method comprising:
    inserting a first delay sequence of data values into an output data sequence of data values, a portion of the output data sequence following the first delay sequence being the same as a corresponding portion of an input sequence of decoded data obtained from a decoder that operates according to a speech coding/decoding process, the input sequence having at least one distorted non-voice sequence representing a non-voice signal;
    inserting a second delay sequence into the output data sequence in response to determining that the non-voice signal is likely to be in the input sequence, based on values associated with the input sequence and the speech coding/decoding process, a portion of the output data sequence prior to the second delay sequence being the same as a corresponding portion of the input sequence; and
    inserting a substantially undistorted non-voice sequence into the output sequence following the second delay sequence, the undistorted sequence being at least of substantially the same length as the distorted sequence, a portion of the output sequence following the undistorted sequence being the same as a corresponding portion of the input sequence.

6. The method of claim 5 wherein the undistorted non-voice sequence comprises a sequence of dual tone multiple frequency (DTMF) signal values.

7. The method of claim 5 wherein the undistorted non-voice sequence comprises a regenerated non-voice sequence that matches the non-voice signal.

8. The method of claim 5 wherein the second delay sequence is longer in time than the first delay sequence.

9. The method of claim 5 wherein the values comprise a plurality of linear prediction coding (LPC) parameters received by the decoder and associated with the input sequence.

10. The method of claim 5 further comprising processing the output sequence to identify the undistorted sequence as representing a DTMF digit.

11. An apparatus comprising:
    buffer having an input to receive a sequence of decoded data having a non-voice signal and speech therein and a first buffer output that provides the decoded data in a first in first out manner, wherein the buffer comprises a first FIFO buffer portion and a second FIFO buffer portion in series therewith that receive the decoded data;
    signal processor having an input to receive the decoded data and a processor output that provides a sequence of regenerated data representing a regenerated non-voice signal, the processor generates a select signal in response to identifying the non-voice signal in the sequence of decoded data;
    first multiplexer having a first input coupled to the first buffer output to receive the decoded data, a second input coupled to the processor output to receive the regenerated data, and a first multiplexer output that provides data from the second input in response to the select signal;

predictor that determines whether a non-voice signal is likely to be in the sequence of decoded data based on values associated with the sequence of decoded data and representing characteristics of a speech coding/decoding process used to generate the decoded data; and second multiplexer having a first input coupled to receive the sequence of decoded data, a second input coupled to an output of the second buffer portion, and an output coupled to the first input of the first multiplexer, the second multiplexer provides data at its output from its second input in response to a select signal from the predictor.

12. The apparatus of claim 11 wherein the non-voice signal comprises a tone signal.

13. The apparatus of claim 11 where in the regenerated non-voice signal matches the non-voice signal.

14. A repeater comprising:
means for storing an input sequence of decoded data having a non-voice signal and speech therein, in a first in first out manner, wherein the non-voice signal and speech have been processed in accordance with a speech coding/decoding process;
means for providing a sequence of regenerated data representing a regenerated non-voice signal matching said non-voice signal;
means for providing an output sequence being a delayed version of the input sequence;
means for providing the sequence of regenerated data as part of the output sequence in response to identifying the non-voice signal in the input sequence; and
means for inserting a further delay sequence into the output sequence, in response to determining that a non-voice signal is likely to be in the input sequence based on values associated with the input sequence and the speech coding/decoding process.

15. The repeater of claim 14 wherein the non-voice signal comprises a DTMF signal.

16. The repeater of claim 14 wherein the values associated with the input sequence and the speech coding/decoding process comprise linear prediction coding (LPC) parameters.

17. The repeater of claim 14 further comprising means for decoding a plurality of encoded packets into said sequence of decoded data according to a speech coding/decoding process.

18. A method comprising:
subjecting an input sequence of decoded data to a first delay, the input sequence having at least one distorted non-voice sequence representing a non-voice signal; and then
subjecting the input sequence of decoded data to a second delay that is longer than the first delay, in response to determining that a non-voice signal is likely to be encountered in a next frame of said decoded data; and then
subjecting the input sequence back to the first delay in response to detecting no non-voice signals during a given time interval in which the input sequence is subjected to the longer, second delay.

19. The method of claim 18 wherein the non-voice signals are DTMF signals.

20. The method of claim 19 wherein the first delay is no more than two frames long and the second delay is no more than five frames long, each frame to contain about ten (10) msec of decoded audio data.

21. The method of claim 19 wherein the given time interval is at most two frames long, each frame to contain about ten (10) msec of decoded audio data.

22. An article of manufacture comprising:
a machine-readable medium having data stored therein which, when accessed by a processor, processes a sequence of input data that has been obtained from a coding/decoding process to determine whether any non-voice signal is likely to be in the sequence of input data; and,
if it has been determined that a non-voice signal is likely, starts to process the sequence to identify any non-voice signal therein; and,
while processing the sequence to identify any non-voice signal, if no non-voice signal is identified after having processed a predetermined amount of said input data in the sequence, then stops said processing to identify, but if a non-voice signal is identified then undistorted data representing the identified non-voice signal is generated to substantially replace a portion of the sequence of input data that contains a distorted non-voice signal
wherein the medium has data that inserts a first delay interval into a sequence of output data that is otherwise substantially the same as the sequence of input data, while performing said processing to determine whether any non-voice signal is likely, and
inserts a further delay interval into a path taken by the sequence of input data to yield the sequence of output data, while performing said processing to identify any voice signal.

23. The article of manufacture of claim 22 wherein said data is to treat the non-voice signals as DTMF signals.

24. The article of manufacture of claim 23 wherein the data is to treat the input data as having been obtained from a speech coding/decoding process that codes speech at 8 kbit/sec or less.

25. The article of manufacture of claim 22 wherein the medium includes data that removes said further delay interval from the path taken by the sequence of input data if no non-voice signal is identified after having processed the predetermined amount of said input data.

* * * * *